Feb. 25, 1936.  J. W. HARRISON ET AL  2,031,600
CONTROL OF CATALYTIC REACTIONS
Filed May 18, 1932
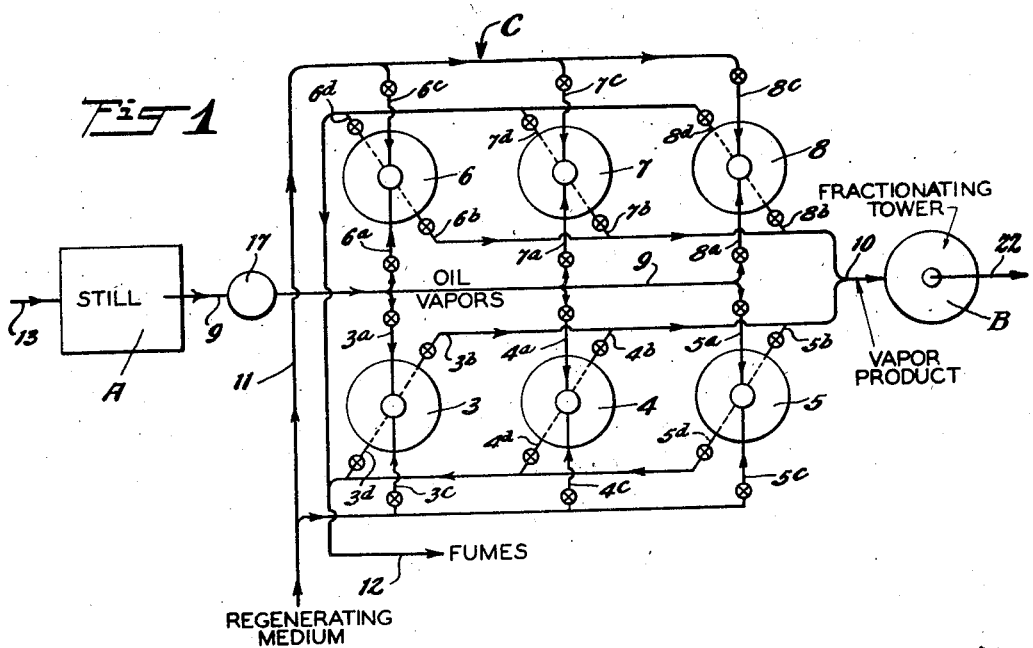
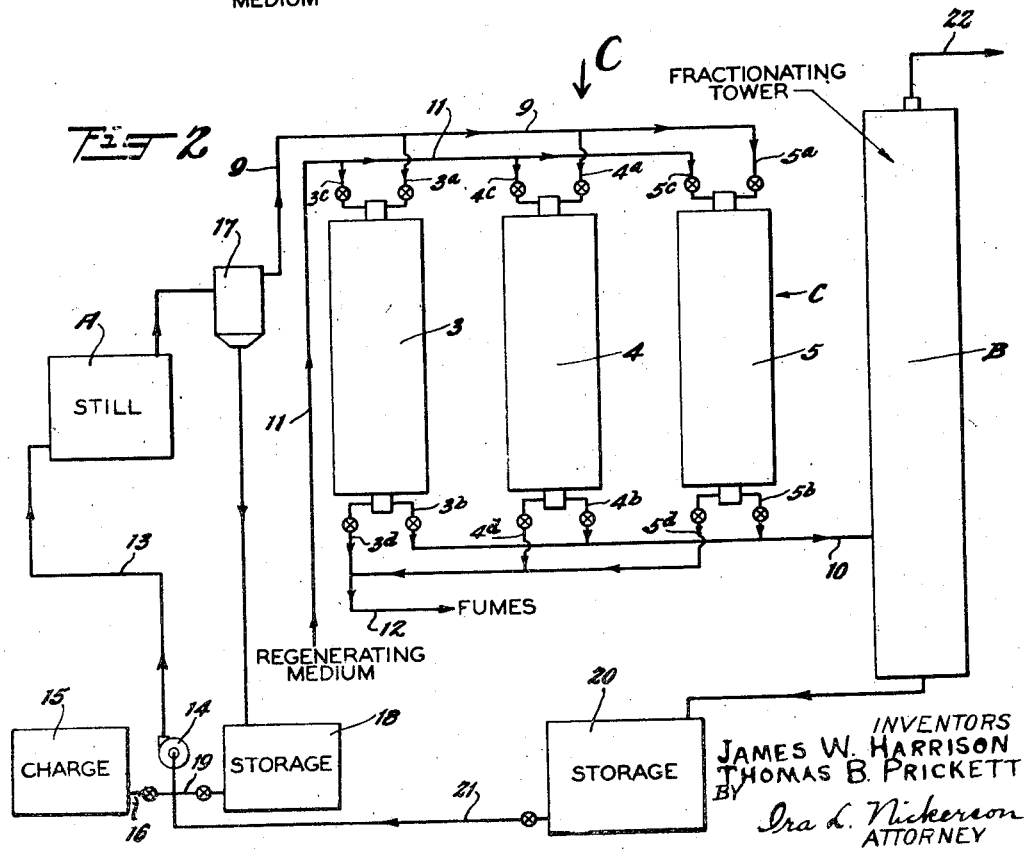

Patented Feb. 25, 1936

2,031,600

UNITED STATES PATENT OFFICE 2,031,600

CONTROL OF CATALYTIC REACTIONS

James W. Harrison and Thomas B. Prickett, Woodbury, N. J., assignors to Houdry Process Corporation, Dover, Del., a corporation of Delaware Application May 18, 1932, Serial No. 612,086

15 Claims. (Cl. 196—52)

This invention relates to chemical transformations induced or supported by contact masses having catalytic activity, and more particularly to the technique of control, both in process and in apparatus aspects, whereby the extent of the convertive reaction may be limited or extended as may be requisite or desirable to conform to differing operating conditions.

It especially concerns operations in which the reaction is dependent upon many factors and, if not restrained, may continue far beyond the desired point with the result that the economics of the operation may be entirely upset. This is particularly true when the material to be converted is of a composite or complex nature. There are probably no materials which involve greater complexity or variation than certain of the hydrocarbon groups, such as the bitumens, especially petroleum, and, while the invention in certain aspects is of broad scope, it has a specific and direct application to the problems involved in the catalytic conversion of high boiling hydrocarbons into low boiling hydrocarbons, as in the manufacture of gas, benzine, gasoline, naphtha, kerosene, etc. from crude petroleum or from hydrocarbon derivatives and residues generally.

In the conversion or transformation of hydrocarbons by the action of contact masses, the process of treatment which appears from extensive trials to give the best results is to make a complete pass or once-through feeding of a batch of the fresh material through the apparatus at a given temperature and to follow it with successive and independent run passes of the successive residues at progressively higher temperatures. Treatment is stopped when no further conversion is desired at the selected highest operating temperature. It has been found, however, that with an increase in temperature the activity of certain catalysts is accelerated so as to produce compounds other than those desired. Consequently, if the period of contact of the material with the catalyst giving the best result at one temperature is maintained in a recycle pass at higher temperature, the transforming reaction will tend to continue beyond the optimum point for securing the exact product desired and/or the best yield. Hence a certain degree of flexibility of operating control is required and while this may be readily arranged in connection with small scale or experimental operations, serious difficulties are encountered in plants operating on a commercial scale since a change in the rate of flow will require units of disproportionate size with excessive expense for equipment and, in addition, the plant will be out of balance during at least a part of its operation. As an alternative, the quantity of catalyst would need to be changed from time to time to conform to necessary variations in the operating temperature. But this is impractical with previously known plants designed for continuous operation and for regeneration of the catalyst in situ.

One object of the invention is to provide flexibility of operation and of control in the catalytic conversion of substances. Another object is to devise apparatus and methods of operation adapted for economical production on a commercial scale when the catalytic mass is arranged for regeneration in situ. Other objects will be apparent from the detailed description which follows:

Instead of following the practice of using only two catalytic boxes, one of which is always in regeneration while the other is on stream, a greater number of boxes are provided and the number on stream is selected to suit the prevailing operating conditions. The best numbers are four, six and twelve. If it is considered that normal operation of half the boxes on stream and the other half in regeneration represents 100% time of contact of the material with the catalytic mass, then with the four-box arrangement the contact time can be reduced 50% by using only one box at a time with the remaining three in regeneration. With the six-box arrangement, the contact time can be reduced to 66⅔% by having two boxes on stream while four are in regeneration, and to 33⅓% by having only one box on stream while the other five are in regeneration. With the twelve box arrangement, the contact time can be reduced to 66⅔% by using the boxes in groups of four, to 50% by using groups of three, and to 33⅓% by using groups of two. Eight boxes would present no advantage over four, and ten boxes would permit only 100% and 40% time of contact. Many factors make the six-box arrangement the best from a commercial standpoint, and it is accordingly shown in the accompanying drawing as being the preferred form.

In the drawing, Fig. 1 is a diagrammatic plan view; and

Fig. 2 is a diagrammatic side elevational view of the elements shown in Fig. 1.

For the present invention, the essential elements are a tube still or other heating means A, a fractionating tower B, and a battery C of boxes interposed between still A and tower B and connected to both. The entire apparatus is designed to move fluid therethrough at a predetermined rate. The number of catalytic boxes in battery C must be more than two, but a multiple of two. A preferred number, namely six, is shown in the drawing, the boxes being indicated by reference characters 3, 4, 5, 6, 7 and 8, respectively. A vapor line 9 from still A has valved branches 3a, 4a, 5a, 6a, 7a and 8a leading to the corresponding boxes respectively, and a branched trunk line 10 leads to fractionating tower B with valved branches 3b, 4b, 5b, 6b, 7b and 8b leading from the boxes respectively. To provide for regeneration of the catalytic masses in the boxes of the battery C, a branched supply line 11 for the regenerating medium connects with the boxes by valved supply lines 3c, 4c, 5c, 6c, 7c and 8c, respectively. Also, a branched exit trunk 12 is provided for the fumes of regeneration, having valved connections 3d, 4d, 5d, 6d, 7d and 8d leading to the respective boxes.

The charge may be fed to the still through a supply line 13 supplied by a pump 14 which is connected to storage tank 15 by a valved line 16. If desired, a separator 17 may be inserted in the vapor discharge line of still A for removing any atomized charge, the latter being returned as liquid to one or more storage tanks 18 which may connect with pump 14 by valved line 19. The vapors leaving separator 17 pass directly into the vapor line 9 and thence through selected groups of the boxes in battery C as will be later described. The condensate which forms in fractionating tower B is run into one or more storage tanks 20 connecting with pump 14 by a valved line 21. The vapors which leave tower B through line 22 may be condensed and led to a storage tank (not shown) or may pass directly into a stabilizing and refining section (not shown).

The catalytic mass which is distributed among boxes 3 to 8 inclusive, making up battery C, may consist of any known or suitable material capable of effecting the desired transformation, but must be in the form of fragments, lumps or molded pieces which will enable the same to be regenerated in situ. One catalytic material which may be used in the conversion of high boiling hydrocarbons into low boiling hydrocarbons is activated hydrosilicate of alumina, preferably containing not more than 3% ferric oxide, mixed or not as desired with other material having adsorptive or catalytic activity including metallic oxides as set forth in the copending application of Eugene J. Houdry, Serial No. 600,581, filed March 23, 1932. This catalyst tends to seek, in a complex substance such as a gas oil, the lightest products available under the temperature conditions of the reaction. Hence, in order to secure the desired light products, it is necessary to halt the reaction at a certain point. This can be effected by controlling the feeding conditions, inasmuch as the catalyst has a greater affinity for the raw charge or high boiling constituents than it has for the light ones resulting from the transformation. Hence, the light products will be continuously displaced by the fresh feed or charge. Obviously, the reaction must be halted when the activity of the catalyst becomes impaired to a serious extent due to the deposit thereon of carbonaceous, sulphurous, and other contaminants resulting from the transforming reaction, which contaminants are removed by the subsequent regenerating operation.

The catalyst is able, at a given temperature, to transform a certain portion of the charge into lighter products which will comprise a certain percentage of fixed gases and a certain percentage of liquid hydrocarbons. The amount of fixed gas will be quite small but this percentage increases at the expense of the percentage of liquid hydrocarbons with an increase in the time of contact between the material and the catalyst as when there is a slow feed of the charge. If the charge is fed too fast, the product is displaced from the catalyst before the transformation is completed, with the result that the yield will be lowered and a product of the desired degree of lightness may or may not be secured.

For the best yield of light products by catalytic action, the gas oil or other charging stock is sent through the apparatus in a series of independent passes at progressively increasing temperatures between 800 and 1000° F. The passes are once-through operations and are not to be confused with continuous or internal recycling of unconverted stock as commonly used in some of the well known thermal cracking processes. The fresh charging stock is fed for the first pass; the unchanged material remaining thereafter is fed to the catalyst independently, which operation comprises the second pass, the unconverted portion of which is fed for the third pass, etc. The most important controlling factors are the operating temperature, the time required for the reaction, and the time of contact between the charge and the catalyst. If the operating temperature is raised, the catalyst becomes more active, so that the time of reaction is automatically shortened, and, to compensate for this, the time of contact between the charge and the catalyst should be reduced. This is conveniently accomplished by the selective use of the catalytic boxes making up battery C. For example, assuming four passes are needed to get the desired yield from a given charging stock, with an operating temperature of 850° F. for the initial pass, the boxes will be divided into two groups of three each alternately on stream and in regeneration, as for example, boxes 3, 4, and 5 in one group, and 6, 7, and 8 in the other. For the second pass or run at about 880° F., the same grouping will be used. For the third pass at 910° F., the boxes are arranged in three groups of two boxes each, so that when one group, such as 3, 4, is on stream, the other two groups, 5, 6, and 7, 8 will be in regeneration. This change takes care of the increased activity of the catalyst in that the amount of catalyst per unit of volume of charge is now but two-thirds of what it was before, and the time of contact between the charge and catalyst has also been reduced, since the rate of feed remains the same per unit of time but the charge is now sent through two boxes in parallel instead of three boxes in parallel in going from still A to tower B. A longer regenerating period is needed on account of the greater deposit of contaminants in the catalytic mass. The same grouping by twos may be used for the fourth and last pass. If a greater number of passes is made with a higher temperature for the last pass, the catalytic mass may be still further reduced per unit of flow by using one box on stream while five are in regeneration. With an initial rate of feed for three boxes of 8 on 20 (8 litres of oil per hour to 20 litres of catalyst), the actual contact time may vary from that represented by .4 volumes of oil per volume of catalyst (when three boxes are used) to that represented by 1.2 volumes of oil per volume of catalyst (when one box is used), and this without making any change whatever in the rate of feed from still A which is held constant. Any desired pressure either above or below atmospheric may be maintained in the catalytic boxes, and the pressure may be changed or varied between some or all of the passes. The transforming or cracking operation is endothermic, while the regenerating operation is exothermic.

We claim as our invention:

1. In endothermic chemical transformations involving the use of a contact mass having catalytic activity and capable of transforming the starting material such as mineral oil in repeated passes during which the repassed material becomes more and more refractory, the process which comprises bringing the material to be transformed repeatedly into contact with said mass in separate and distinct passes at different temperatures and varying the volume of the mass inversely with the changes in temperature while the rate and volume of feed of material to the mass is held substantially constant.

2. In the transformation of material such as mineral oil, its distillates and residues which becomes more and more refractory in repeated passes through a catalytic mass capable of effecting the desired conversion, the process which comprises bringing the fresh charge and thereafter the untransformed portions of the material in repeated but distinct and separate passes at increased temperatures into contact with said mass, and increasing the feed rate to catalyst volume ratio with the passes at higher temperatures by decreasing the quantity of catalyst contacted by the material while the feed rate is held constant thereby to compensate for the increased activity of the catalyst at such higher temperatures.

3. In the chemical transformation in straight passes and by an endothermic reaction in the presence of a catalytic mass of material such as mineral oil which becomes increasingly refractory, the process which comprises passing the material to the transforming zone at a predetermined feed rate and at a predetermined temperature, contacting the fed material with a predetermined volume of the catalytic mass, removing the transformed product, passing the untransformed residue by itself at a temperature above said predetermined temperature but at substantially the same feed rate to the transforming zone, repeating the separate passes of untransformed residue at the same feed rate to the transforming zone but at still higher temperatures, and reducing the time of contact during at least one of the later passes with said catalytic mass by reducing the volume of said mass.

4. In the endothermic transforming by the action of a catalyst of material such as a mineral oil which tends to become increasingly refractory, the process which comprises heating the material to be transformed, bringing the material and thereafter the successive untransformed residues thereof in vapor phase into contact with a catalyst in successive but separate and distinct passes at progressively higher temperatures but at a substantially constant rate of feed to the catalytic zone, and reducing the quantity of the catalyst contacted by the untransformed material in the later passes by at least a third to compensate for the increased activity of the catalyst at the higher temperature.

5. In the catalytic transformation of hydrocarbons, the operating process comprising contacting the fresh charge of hydrocarbons and thereafter the untransformed residues with the catalyst in a plurality of separate and successive passes at progressively increasing temperatures but at substantially the same feed rate to the catalytic zone, fractionating the contacted hydrocarbons after each of said passes and removing the overhead from said fractionations from the transforming zone, and decreasing the volume of the catalyst between certain of said passes so as to decrease the time of contact while the rate of feed to the catalytic zone remains constant during all passes.

6. In the catalytic transformation of hydrocarbons, the operating process which comprises heating the charging stock, feeding it at a predetermined rate to a catalyst capable of making the desired transformation, fractionating the transformed charge thereby to obtain a light fraction and a residue, heating said residue to a higher temperature than said charging stock and subjecting it in a separate operation to the action of the catalyst while feeding it thereto at substantially said predetermined rate, separating the transformed charge into a light fraction and a residue, subjecting said residue and the successive residues resulting therefrom after similar once-through operations at progressively elevated temperature levels and at substantially said predetermined rate to the action of the catalyst, and reducing the volume of the catalyst between certain of the once-through operations while the rate of feed to the catalytic zone remains constant, the volume reductions of catalyst to total at least a third of the initial catalyst volume.

7. In the catalytic transformation of hydrocarbons, the operating process which comprises heating the charging stock, feeding the charge in vapor phase at a predetermined rate to a catalyst capable of effecting the desired transformation, fractionating the transformed charge thereby to obtain a light fraction and a residue, heating said residue to a higher temperature than said charging stock and subjecting it in vapor phase in a separate operation to the action of the catalyst while feeding it thereto at substantially said predetermined rate, separating the transformed charge into a light fraction and a residue, subjecting said residue and the successive residues resulting therefrom after similar once-through operations in vapor phase at progressively elevated temperature levels and at substantially said predetermined rate to the action of the catalyst, and reducing the volume of the catalyst between certain of the once-through operations while the rate of feed to the catalytic zone is held constant, one of the volume reductions to take place after obtaining the second of said residues and before subjecting it to the action of said catalyst and said volume reduction to be a third of the initial catalyst volume.

8. In the chemical transformation by the action of a catalytic material capable of regeneration in situ of material such as mineral oil, its distillates and residues which tend to become increasingly refractory with successive contacts with the catalyst, the operating process comprising heating the fresh material, subjecting it in vapor phase at a predetermined rate of feed to the action of the catalyst, heating the untransformed portion of the contacted material to a higher temperature than said fresh material, subjecting it in vapor phase in a plurality of separate and distinct passes at successively higher temperature levels for each of said passes and substantially at said predetermined rate of feed to the action of the catalyst, at least a portion of the contacted material from each pass serving as feed for the following pass, and reducing the volume of catalyst contacted by the untransformed material in the later passes as the material becomes more refractory while the rate of feed to the catalytic zone is held constant.

9. In the chemical transformation of material, such as mineral oil, by an endothermic reaction in the presence of a catalytic mass divided into a plurality of parts and disposed in a transforming zone, each part being arranged for alternate transforming and regenerating operations, the process which comprises effecting a series of separate and distinct passes, first of the charging material and thereafter of the untransformed residues thereof through the catalytic mass, the successive passes being at progressively higher temperatures, maintaining substantially the same rate of feed to the transforming zone for all of the passes, and utilizing the parts of the catalytic mass in parallel and fewer of them for the passes at higher temperatures than for the passes at lower temperatures thereby to decrease the time of contact of the material with the catalytic mass and to give additional time for regeneration of those parts of the same not engaged in the transforming operation as the operating temperature is increased.

10. In the chemical transformation of material such as mineral oil by an endothermic reaction in the presence of a catalytic mass capable of regeneration in situ, the process which comprises dividing the catalytic mass into a plurality of parts disposed in a transforming zone, the number of parts being greater than two and a multiple of two, passing the material to be transformed through the mass in a plurality of successive but distinct and separate passes at progressively higher operating temperatures, maintaining substantially the same rate of feed to the transforming zone for all of the passes, utilizing half the parts of the mass for the transforming operation and half in regeneration for the first passes, and reducing the fractional portion of the parts used in the later passes thereby to restrict the time of contact of the material with the catalytic mass as the operating temperature is increased.

11. In the conversion of hydrocarbons by the use of a contact mass having catalytic activity, the process which comprises bringing the hydrocarbon material to be transformed repeatedly but in separate and distinct passes at a substantially constant feed rate and at progressively higher temperatures in a range of 800° to 1000° F. into contact with a catalytic mass comprising essentially hydrosilicate of alumina and varying the volume of the mass inversely with the changes in temperature without modifying the feed rate to the transforming zone.

12. In the chemical transformation of hydrocarbons by the action of a catalytic mass, the process which comprises passing hydrocarbons through said mass at a predetermined temperature above 800° F., segregating the transformed product, passing the untransformed residue at a temperature above said predetermined temperature but below 1000° F. through said mass, repeating the passes of successive residues through said mass at still higher temperature but below 1000° F., and reducing the time of contact of at least one of said residues with said catalytic mass by reducing the volume of the latter while maintaining in all passes the same rate of feed to the transforming zone.

13. In the chemical transformation of hydrocarbons by the action of a catalytic mass capable of regeneration in situ, the operating process which comprises disposing the catalytic mass in a transforming zone in a plurality of parts, the number of parts being greater than two and a multiple of two, charging the hydrocarbons and the untransformed residues thereof to the transforming zone at a constant feed rate in a plurality of successive but separate and distinct passes at progressively higher operating temperatures, the highest of which is not in excess of 1000° F., and selectively utilizing said parts in parallel to decrease the time of contact of the hydrocarbons with the catalytic mass as the operating temperature is increased while maintaining the feed rate to the transforming zone constant.

14. In the chemical transformation of hydrocarbons by the action of a catalytic mass divided into a plurality of parts and disposed in a transforming zone, each part being arranged for operation alternately on stream and in regeneration, the operating process which comprises effecting an initial pass of the starting material followed by a series of separate passes in succession of the untransformed material through the transforming zone at temperatures above 800° F. and below 1000° F., the successive passes being at progressively higher temperatures, maintaining substantially the same rate of feed to the transforming zone for all the passes, and utilizing fewer of the catalytic parts in parallel for the passes at higher temperature than for the passes at lower temperature thereby to decrease the time of contact of the parts of the hydrocarbons with the catalytic mass and to give additional time for regeneration of the same as the operating temperature is increased.

15. In the chemical transformation of hydrocarbons by the action of a catalytic mass capable of regeneration in situ, the process which comprises dividing the catalytic mass in the transforming zone into a plurality of parts, the number of parts being greater than two and a multiple of two, charging the hydrocarbons and thereafter the successive untransformed residues thereof at a predetermined rate to the transforming zone in a plurality of successive but separate and distinct passes at progressively higher operating temperatures the lowest of which is above 800° F. and the highest below 1000° F., utilizing half the number of parts for the transformation of at least the first pass and reducing the fractional portion of the parts used in at least one of the later passes thereby to restrict the time of contact of the hydrocarbons with the catalytic mass while maintaining substantially said predetermined feed rate throughout all the passes.

JAMES W. HARRISON.
THOMAS B. PRICKETT.